United States Patent [19]
Posso

[11] Patent Number: 4,723,731
[45] Date of Patent: Feb. 9, 1988

[54] REEL OF PLASTICS MATERIAL FOR MAGNETIC TAPE

[75] Inventor: Patrick Posso, Lausanne, Switzerland

[73] Assignee: Gefitec S.A., Lausanne, Switzerland

[21] Appl. No.: 894,700

[22] Filed: Aug. 8, 1986

[30] Foreign Application Priority Data

Aug. 14, 1985 [CH] Switzerland .......................... 3490/85

[51] Int. Cl.⁴ ...................... B65H 75/18; G03B 1/04; G11B 15/32
[52] U.S. Cl. .................... 242/197; 242/71.8; 242/198
[58] Field of Search ...................... 242/71.8, 197, 199, 242/198, 200

[56] References Cited

U.S. PATENT DOCUMENTS

| 3,236,468 | 2/1966 | Foret | 242/198 |
| 3,706,426 | 12/1972 | Prahl | 242/198 |
| 3,871,755 | 3/1975 | Wright | 242/71.8 X |
| 3,905,561 | 9/1975 | Kelch et al. | 242/71.8 |
| 4,210,296 | 7/1980 | Frechette | 242/198 |
| 4,403,749 | 9/1983 | Nakagawa | 242/71.8 |

FOREIGN PATENT DOCUMENTS

| 728146 | 10/1942 | Fed. Rep. of Germany | 242/71.8 |
| 1099755 | 2/1961 | Fed. Rep. of Germany | 242/198 |
| 3108585 | 3/1981 | Fed. Rep. of Germany . | |
| 2445583 | 7/1980 | France . | |
| 2010218 | 7/1979 | United Kingdom . | |
| 2018224 | 10/1979 | United Kingdom . | |
| 2028272 | 3/1980 | United Kingdom . | |
| 2040264 | 8/1980 | United Kingdom . | |

Primary Examiner—Stuart S. Levy
Assistant Examiner—Thomas R. Hannon
Attorney, Agent, or Firm—Willian Brinks Olds Hofer Gilson & Lione Ltd.

[57] ABSTRACT

The reel comprises a winding hub with a flange which presents, on the outside, a toothed ring for drive in rotation and, inside, a toothed track for immobilization, and which is provided with an overmoulded metal washer, the free edge of the hub further being centered and fixed on a second flange and the inner cavity of the hub containing a neutralizable brake normally maintained in engagement with the track and capable of being spaced apart therefrom by a pusher. The second flange comprises a coronal extension extending towards the center and imprisoning the brake in the cavity of the hub thus partially closed, brake whose axial neutralizing stroke is limited.

7 Claims, 10 Drawing Figures

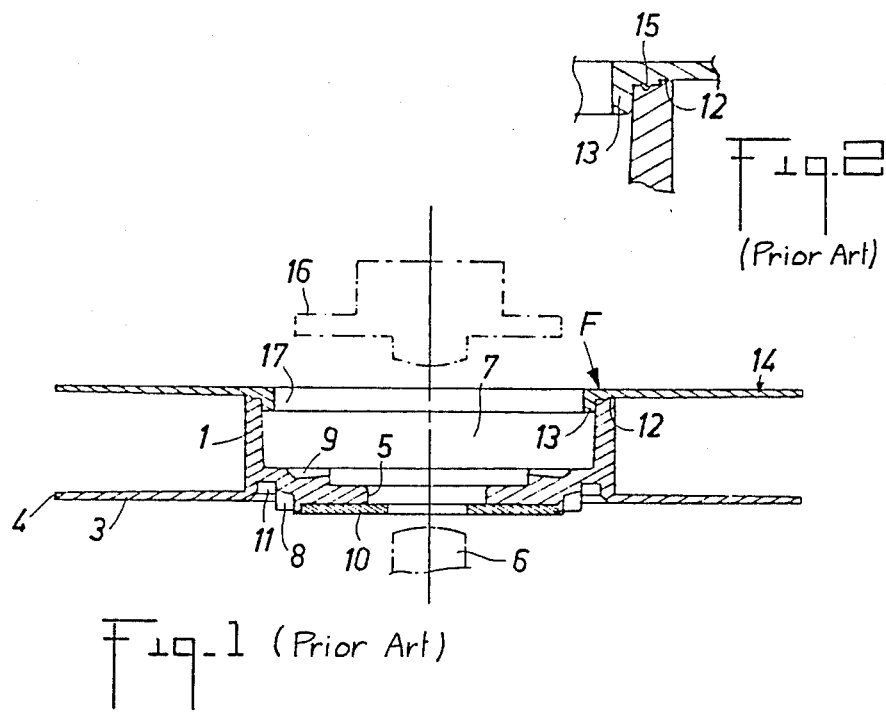
Fig. 2 (Prior Art)
Fig. 1 (Prior Art)
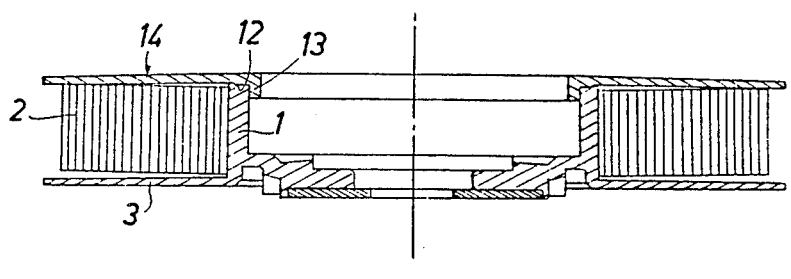
Fig. 3 (Prior Art)
Fig. 4 (Prior Art)
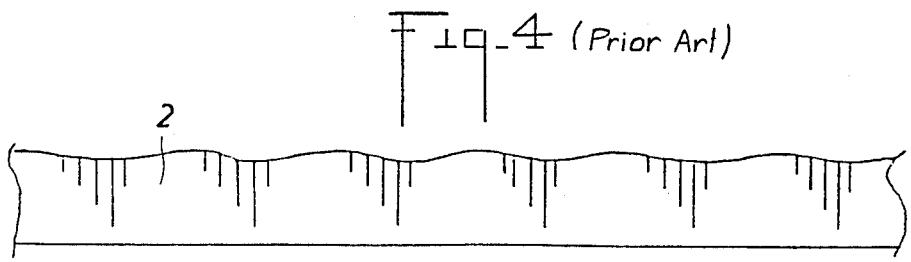

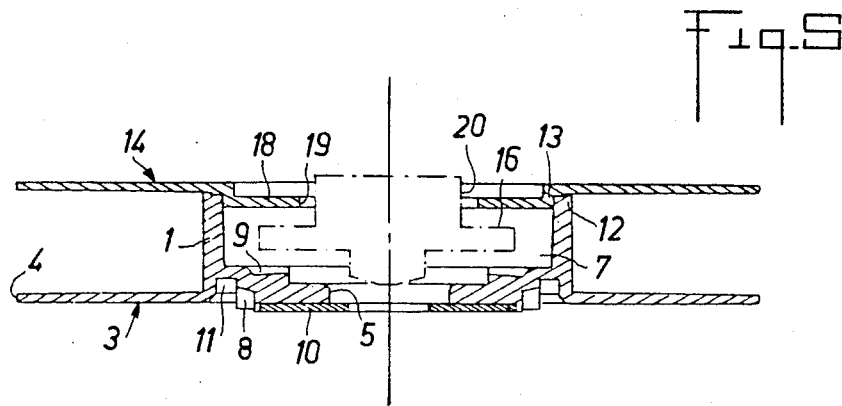
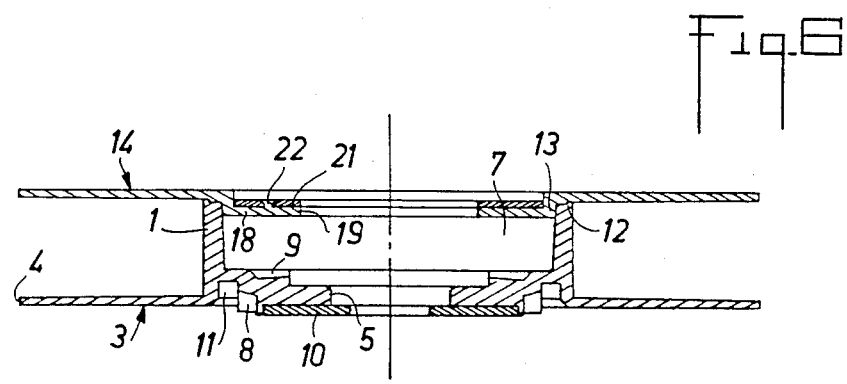
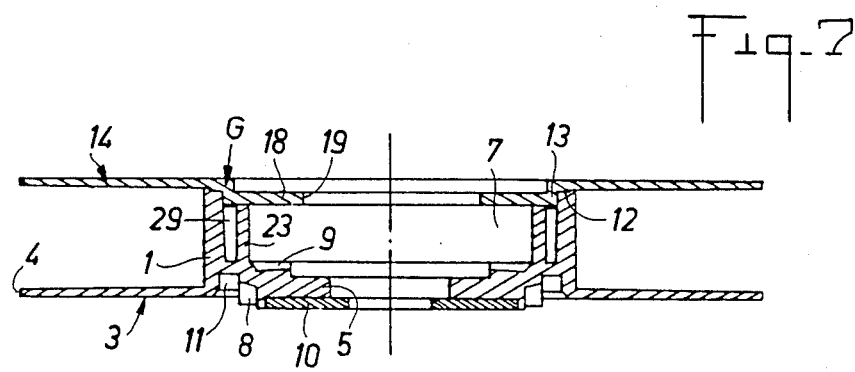

REEL OF PLASTICS MATERIAL FOR MAGNETIC TAPE

The present invention relates to improvements in or relating to a reel of plastics material for magnetic tape, individually prisoner of a cassette housing.

As clearly shown in FIGS. 1 to 4 of the accompanying drawings, such a known reel comprises a hollow cylindrical hub 1 of large diameter provided for the winding of a magnetic tape 2. This hub is integral with a flange 3, the whole being constituted by a reinforced plastics material, preferably by a glass fiber reinforced polycarbonate. Flange 3 extends from its peripheral edge 4 defining the filling capacity to a central hole 5 adapted for the passage of a push element 6 capable of penetrating in the inner cavity 7 of the hub.

This flange 3 presents, on the outside, a toothed ring 8 for driving in rotation and, inside, a toothed track 9 for immobilization located substantially opposite the ring. Flange 3 is in addition provided with an overmoulded metal washer or insert 10. Normally, the reel is centred by an annular groove 11 in its flange 3 on a flange of the housing which contains it; it is therefore mounted idly relatively to the latter and said toothed ring 8 for its drive in rotation and said metal insert for its cooperation with the driving head which comprises the push element 6 mentioned above are then visible from the outside.

The free edge 12 of the hub 1 is centred in a raised edge 13 of a second flange 14 made of non-reinforced plastics material, such as polycarbonate, and the end of this edge 12 is fixed on this second flange by ultrasonic welding at 15 (FIG. 2). A brake 16 is adapted to be introduced into cavity 7 through a passage 17 defined by the raised edge 13 of the second flange. This brake is pushed by a spring abutting on the housing in order to cooperate with the toothed immobilizing track 9 and it may be neutralized by axial spacing under the action of push element 6.

Storage or use of the signals recorded on the magnetic tape 2 requires:

a geometrically perfect winding hub 1 and a compressive strength which is as high as possible, geometrically stable flanges 3, 14 in order not to deteriorate the magnetic tape 2 by their deformation, particularly by friction.

However, the stresses required for the functional use of the reel in question aggravate the difficulties of producing said reel:

by the presence of the overmoulded metal washer or insert 10 which opposes the relatively considerable shrinkage of the material employed, although the filling of glass fibers thereof restricts such shrinkage, by the fact that the introduction of the brake 16 is effected after assembly of the reel and necessitates the formation of a passage 17 in the added flange 14.

The major drawback of this known reel is illustrated in FIG. 3 and results from the poor support of the tape winding 2 of which the turns provoke a considerable radial contraction as the tape is wound with high tension.

When the tape is wound and unwound at high speed and subjected to intensive, sudden and repeated brakings, the hub 1 is deformed in a cone and the same applies to tape winding 2. In addition, the added flange 14 is deformed, due in particular to the radial contraction of the relatively narrow welded ring 15, and touches the tape.

FIG. 4 shows the effect obtained by the friction of the edge of said tape 2 against flange 14: this tape wears on one side, curls and becomes wavy. It is consequently impossible to use.

It is an object of the present invention to overcome these drawbacks by improving this reel of plastics material so that it no longer deforms under severe conditions of use and so that the magnetic tape no longer wears and can be used normally.

To this end and in accordance with the invention, the second flange comprises a coronal extension extending towards the centre and imprisoning the brake in the cavity of the hub thus partially closed, brake whose axial neutralizing stroke is limited.

The coronal extension of the second flange is advantageously reinforced by a preferably metallic washer fixed thereto.

Moreover, the reel may comprise an inner reinforcement both of the hub and of the fixation thereof on the second flange.

According to a first embodiment, the reinforcement is a tubular sleeve concentric to the hub and also integral with the first flange, this sleeve and this first flange preferably being connected by axial ribs.

According to a second embodiment, the reinforcement is constituted by a plurality of inner ribs projecting inside the hub.

In either case, the end of the reinforcing elements (sleeve and/or ribs) are fixed on the second flange in order to increase the radial extent of the zone of fixation, such fixation being able to be effected by ultrasonic welding, gluing, riveting or the like.

The invention will be more readily understood on reading the following description with reference to the accompanying drawings, in which:

FIG. 1 is a diametrical section of a known reel described hereinabove, to which the improvements of the invention are applied.

FIG. 2 is an enlarged partial view showing the detail designated in FIG. 1 by arrow F.

FIG. 3 is a view similar to FIG. 1 illustrating the deformation of this know reel and the magnetic tape winding that it contains.

FIG. 4 is a plan view showing a piece of magnetic tape deteriorated by friction in the deformed reel of FIG. 3.

FIGS. 5 to 7 and 10 are views similar to FIG. 1, illustrating several embodiments of the improvements according to the invention.

The same means as those described with reference to FIG. 1 are found again in FIGS. 5 to 10 and they are therefore designated by the same reference numerals in these Figures.

Figure 8:
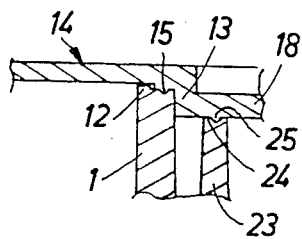
FIGS. 8 and 9 are enlarged partial views showing two different modes of connection of the detail designated in FIG. 7 by arrow G.

In accordance with the embodiment of FIG. 5, the annular raised edge 13 of the added flange 14 is integral with a coronal extension 18 which partially obturates the wide passage 17. This extension 18 extends towards the centre and defines a central hole 19. The latter presents a section smaller than said passage, being given that the axial neutralizing stroke of the brake 16 is now limited to what is merely necessary for spacing it from the immobilizing track 9. The brake is therefore prisoner of cavity 7 and must be mounted before the flange 14 is fitted and fixed on the hub 1. Only the end-piece 20 of the brake and the spring of the housing which surrounds it pass through the hole 19. In this way, the reel is rigidified by this hub.

In order to improve this rigidification, the coronal extension 18 may be reinforced, as shown in FIG. 6, by a washer 21, preferably made of metal, which is fixed thereto by any appropriate means, such as riveting (22), welding, gluing, overmoulding or the like.

However, this washer 21 may be constituted, like the reinforcing washer 10, by any other material of high mechanical strength, such as a plastics material, reinforced or not, and more especially a polyacetal; in that case, the washer 10 may, like washer 21, be fixed by means other than overmoulding.

Figure 10:
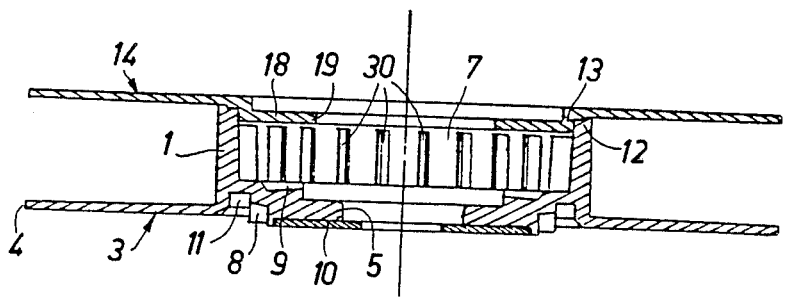

According to other embodiments illustrated by FIGS. 7 and 10 which may or may not be combined with that of FIG. 5 or 6, an inner reinforcement 23, 25, 28, 29 of the hub 1 and of its connection with the added flange 14 is provided.

As shown in FIG. 7, the reinforcement is constituted by a tubular sleeve 23 extending concentrically to hub 1. Sleeve 23 and hub 1 are integral with flange 3 and are both fixed at the end to the second flange 14 and its extension 18 in order to space apart the annular zones of fixation and thus to rigidify the connection with said flange 14.

According to the embodiment of FIG. 8, the edges 12 of hub 1 and 24 of sleeve 23 are fixed by ultrasonic welding respectively at 15 and 25 to flange 14 and extension 18.

Figure 9:
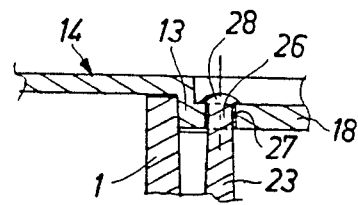

According to the embodiment of FIG. 9 applicable in the event of the two parts which constitute the reel (1 and 23 on the one hand, 14 on the other hand), being made of different plastics materials which cannot be welded together, the edge of sleeve 23 presents projecting lugs 26 passing through holes 27 in extension 18 and riveted on the other side to form retaining heads 28.

It may be advantageous, as shown in FIG. 7, if hub 1 and sleeve 23 are connected together by axial ribs 29 integral therewith in order to improve rigidification further. These ribs may or may not be fixed on the opposite flange 14.

As shown in FIG. 10, the inner reinforcement of hub 1 may be bereft of a sleeve 23 and limited to ribs 30 projecting freely inside said hub 1. In the embodiment shown, the ribs are axial, but they may be shaped differently, in particular as a helix, if demoulding allows this.

What is claimed is:

1. A reel made of plastic material for magnetic tape comprising:
    a first flange including a reinforcing washer, the flange defining a central hole, a peripheral edge, an outside surface and an inside surface;
    a second flange defining a coronal extension extending towards the centre;
    a hollow winding hub of large diameter integral with the first flange, the winding hub defining a free edge and an inner cavity, the free edge of the winding hub being centreed and fixed on the second flange;
    a toothed ring for driven rotation, the toothed ring located on the outside surface of the first flange;
    a toothed track for immobilization, the toothed track located on the inside surface of the first flange substantially opposite the first toothed ring and extending from the central hole;
    a push element passing through the central hole of the first flange; and
    a neutralized brake normally maintained in engagement with the toothed track and capable of being disengaged from the toothed track by the push element, the neutralized brake being imprisoned in the inner cavity by the second flange wherein the axial neutralizing stroke of the brake is limited.

2. The reel of claim 1, wherein the coronal extension of the second flange is reinforced by a washer fixed thereto.

3. The reel of claim 1 or 2, wherein the reel comprises:
    an inner reinforcement of the hub; and
    reinforcing means for reinforcing the fixation of the hub to the second flange.

4. The reel of claim 3, wherein the reinforcement is a tubular sleeve concentric to the hub and integral with the first flange.

5. The reel of claim 4, wherein the tubular sleeve is fixed on the second flange.

6. The reel of claim 3, wherein the reinforcement is constituted by a plurality of inner ribs projecting inside the hub.

7. The reel of claim 6, wherein the inner ribs are fixed on the second flange.

* * * * *

UNITED STATES PATENT AND TRADEMARK OFFICE
CERTIFICATE OF CORRECTION

PATENT NO. : 4,723,731

DATED : February 9, 1988

INVENTOR(S) : PATRICK POSSO

It is certified that error appears in the above-identified patent and that said Letters Patent is hereby corrected as shown below:

IN THE SPECIFICATION

In column 1, line 44, before the first occurrence of "a", please insert -- - --.

In column 1, line 46, before "geometrically", please insert -- - --.

In column 1, line 52, before "by", please insert -- - --.

In column 1, line 56, before "by", please insert -- - --.

In column 2, line 44, please delete "know" and substitute --known-- therefor.

UNITED STATES PATENT AND TRADEMARK OFFICE
CERTIFICATE OF CORRECTION

PATENT NO. : 4,723,731                                    Page 2 of 2

DATED     : February 9, 1988

INVENTOR(S) : PATRICK POSSO

It is certified that error appears in the above-identified patent and that said Letters Patent is hereby corrected as shown below:

IN THE CLAIMS

In column 4, line 14, please delete "centreed" and substitute --centered-- therefor.

Signed and Sealed this

Thirtieth Day of May, 1989

Attest:

DONALD J. QUIGG

Attesting Officer

Commissioner of Patents and Trademarks